(12) United States Patent
Dreiman et al.

(10) Patent No.: US 7,066,722 B2
(45) Date of Patent: Jun. 27, 2006

(54) DISCHARGE VALVE FOR COMPRESSOR

(75) Inventors: Nelik I Dreiman, Tipton, MI (US); Rick L Bunch, Tecumseh, MI (US)

(73) Assignee: Tecumseh Products Company, Tecumseh, MI (US)

(*) Notice: Subject to any disclaimer, the term of this patent is extended or adjusted under 35 U.S.C. 154(b) by 142 days.

(21) Appl. No.: 10/615,214

(22) Filed: Jul. 8, 2003

(65) Prior Publication Data

US 2004/0005234 A1 Jan. 8, 2004

Related U.S. Application Data

(63) Continuation-in-part of application No. 10/166,646, filed on Jun. 11, 2002.

(51) Int. Cl.
*F04B 53/10* (2006.01)

(52) U.S. Cl. ............. 417/559; 350/417; 350/410.3; 137/540; 137/539; 137/543.15; 137/543.17

(58) Field of Classification Search ............ 417/410.3, 417/350 X, 559 X; 137/539, 540 X, 543.15, 137/543.17
See application file for complete search history.

(56) References Cited

U.S. PATENT DOCUMENTS

| | | | |
|---|---|---|---|
| 1,733,180 A | 10/1929 | Biedermann | |
| 1,886,205 A * | 11/1932 | Lyford | 137/543.17 |
| 1,940,999 A | 12/1933 | Ferlin et al. | 251/127 |
| 2,011,547 A * | 8/1935 | Campbell | 137/516.29 |
| 2,025,296 A | 12/1935 | McIntyre | 251/127 |
| 2,318,773 A | 5/1943 | Goetz | 251/127 |
| 2,746,269 A | 5/1956 | Moody | 62/117.6 |
| 2,875,779 A | 3/1959 | Campbell | 137/529 |
| 4,172,465 A * | 10/1979 | Dashner | 137/533.27 |
| 4,515,539 A | 5/1985 | Morishita | 418/55 |
| 4,860,995 A | 8/1989 | Rogers | 251/356 |
| 5,022,146 A * | 6/1991 | Gannaway et al. | 29/888.02 |
| 5,073,096 A | 12/1991 | King et al. | 417/454 |
| 5,088,521 A | 2/1992 | Johnson | 137/516.29 |
| 5,094,085 A | 3/1992 | Irino | 62/175 |
| 5,183,075 A * | 2/1993 | Stein | 137/493.6 |
| 5,207,242 A * | 5/1993 | Daghe et al. | 137/454.6 |
| 5,226,445 A | 7/1993 | Surjaatmadja | 137/516.29 |
| 5,226,799 A | 7/1993 | Raghavan et al. | 417/53 |

(Continued)

FOREIGN PATENT DOCUMENTS

AT         11371         12/1902

(Continued)

*Primary Examiner*—Timothy S. Thorpe
*Assistant Examiner*—Emmanuel Sayoc
(74) *Attorney, Agent, or Firm*—Baker & Daniels

(57) ABSTRACT

A compressor assembly including a compressor mechanism, a compression chamber and a discharge chamber. A discharge port provides fluid communication between the compression chamber and the discharge chamber. A valve seat circumscribes the discharge port. A discharge valve member having a valve head, a biasing section and a valve support is provided and may be formed out of a single integral part. The valve head is engageable with the valve seat. A non-threaded coupling member may mount the valve support to the cylinder block of the compressor mechanism. A guide member engageable with the biasing section of the valve member may also be provided. The valve head may include a second concave surface positioned opposite the surface engageable with the valve seat and have an effective area larger than the discharge port area. The valve head and valve seat may each be partially spherical surfaces having a common radius.

19 Claims, 6 Drawing Sheets

U.S. PATENT DOCUMENTS

| | | | |
|---|---|---|---|
| 5,326,233 A * | 7/1994 | Mochizuki et al. | 417/350 |
| 5,328,344 A * | 7/1994 | Sato et al. | 418/85 |
| 5,346,373 A | 9/1994 | Riffe | 417/415 |
| 5,556,075 A | 9/1996 | Weber | 251/368 |
| 5,564,469 A | 10/1996 | Tremoulet, Jr. et al. | 137/540 |
| 5,577,533 A | 11/1996 | Cook, Jr. | 137/514.3 |
| 5,584,676 A | 12/1996 | Dreiman | 417/569 |
| 5,980,224 A | 11/1999 | Regueiro | 417/569 |
| 6,012,300 A | 1/2000 | Tomatsu et al. | 62/222 |
| 6,098,655 A | 8/2000 | Bloch et al. | 137/488 |
| 6,123,102 A | 9/2000 | Loegel, Sr. | 137/529 |
| 6,132,191 A | 10/2000 | Hugenroth et al. | 418/55.1 |
| 6,134,900 A | 10/2000 | Nishida et al. | 62/216 |
| 6,135,144 A | 10/2000 | Rozek | 137/543.17 |
| 6,171,076 B1 * | 1/2001 | Gannaway | 417/350 |
| 6,179,589 B1 | 1/2001 | Bass et al. | 418/55.1 |
| 6,189,326 B1 | 2/2001 | Tomatsu et al. | 62/222 |

FOREIGN PATENT DOCUMENTS

DE    32 12 949    10/1983

* cited by examiner

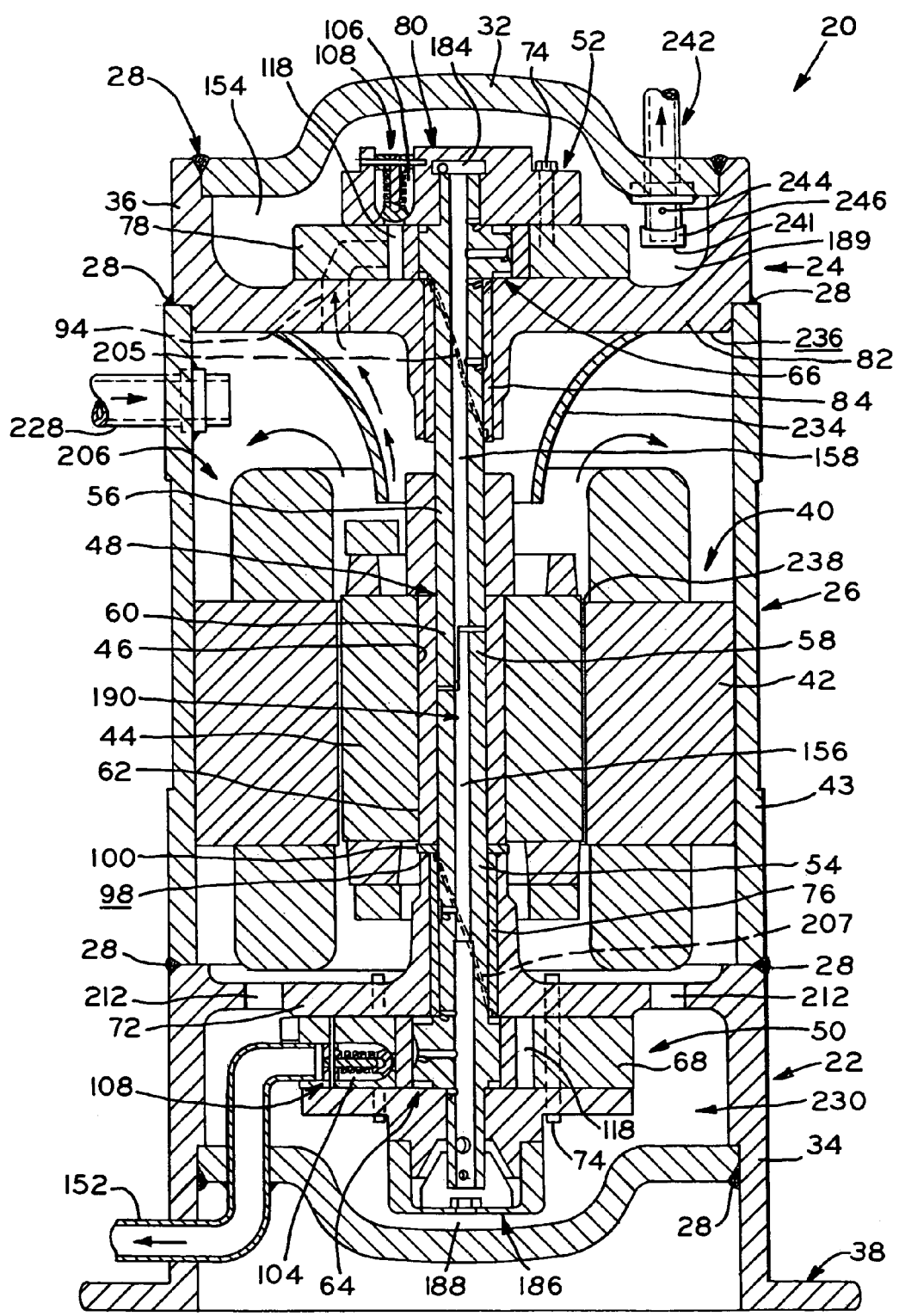
FIG_1

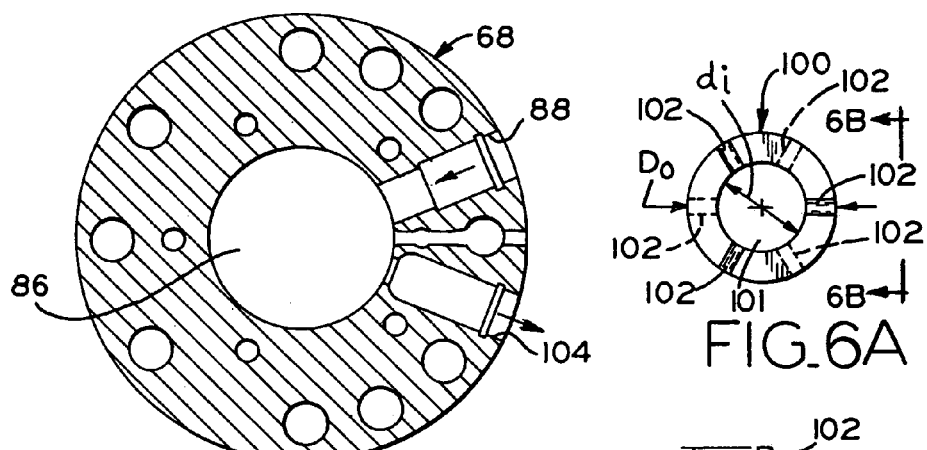
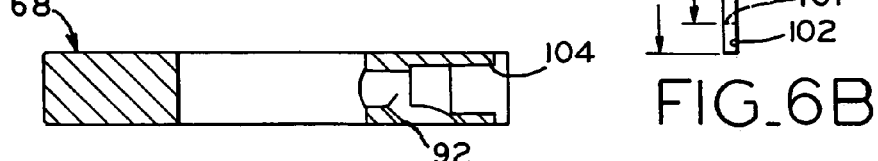
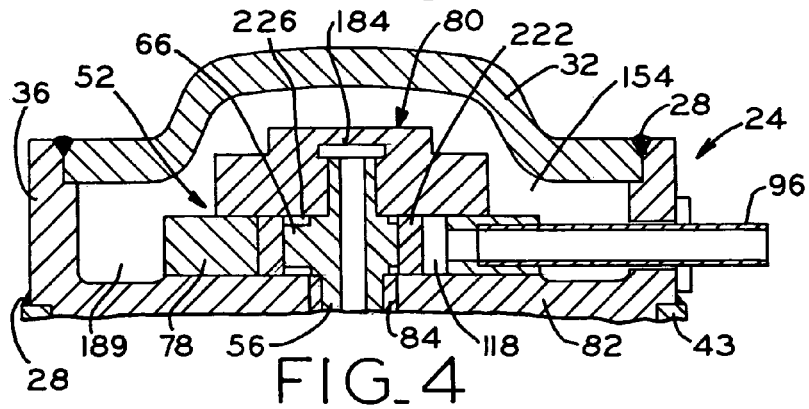
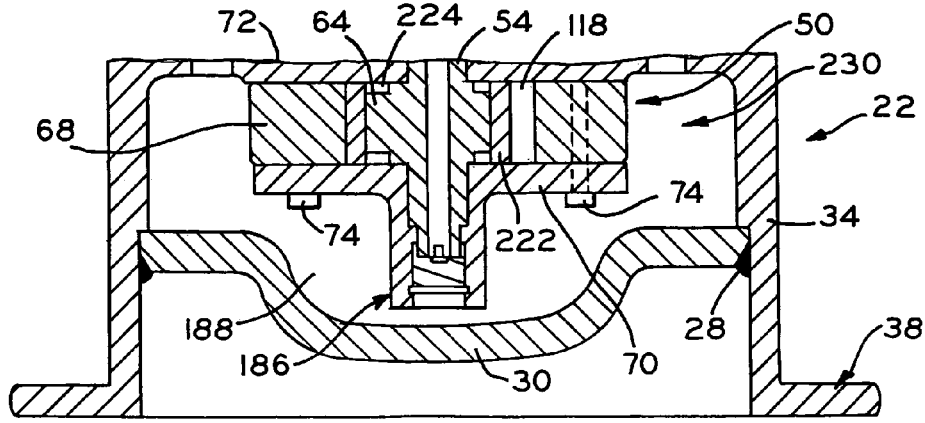

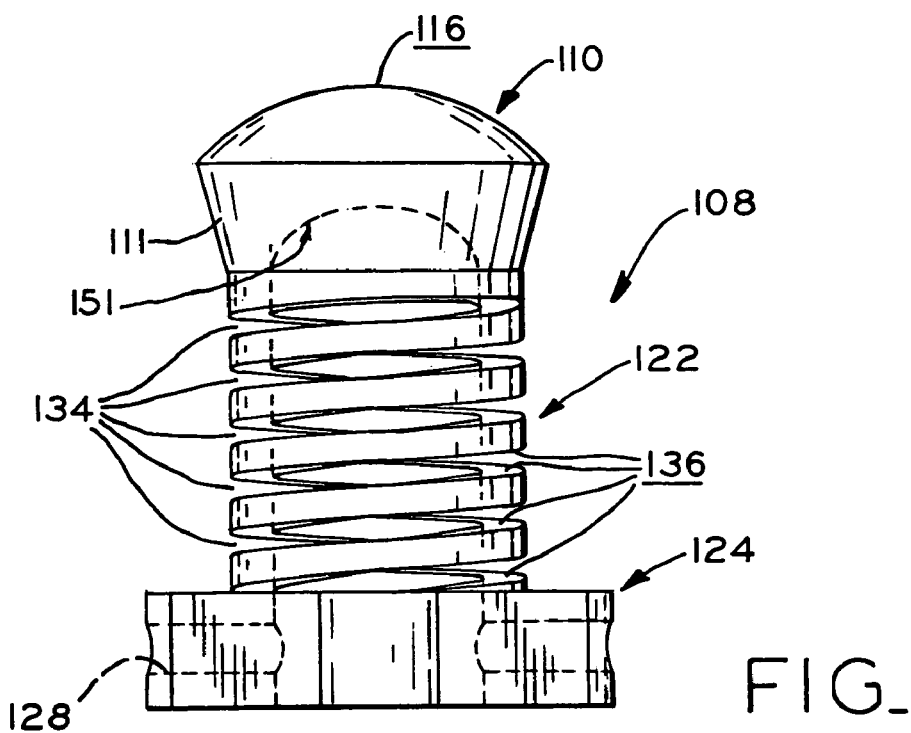
FIG_7
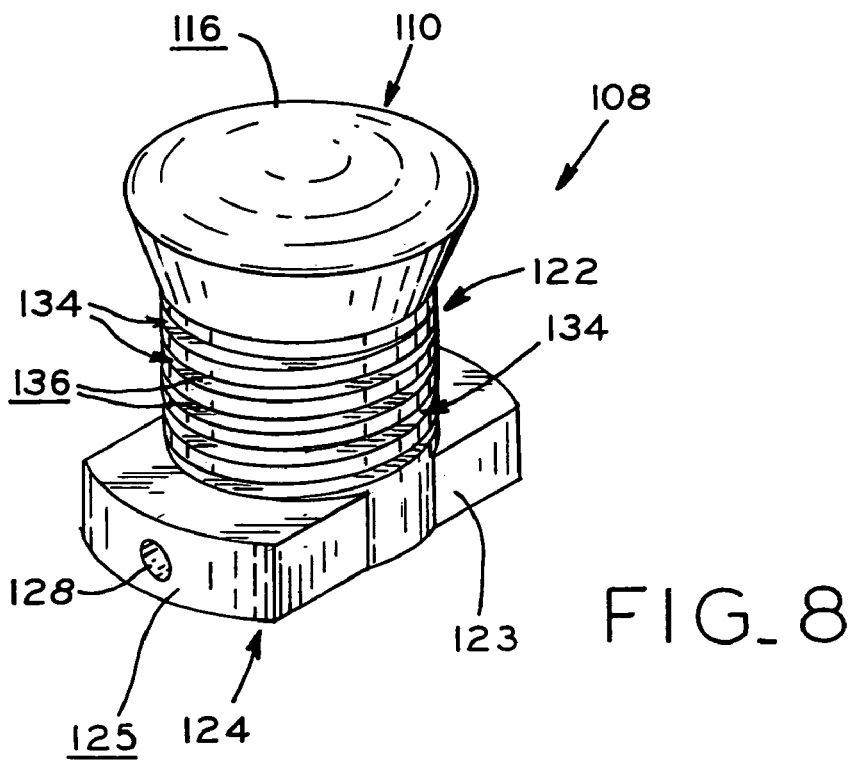
FIG_8

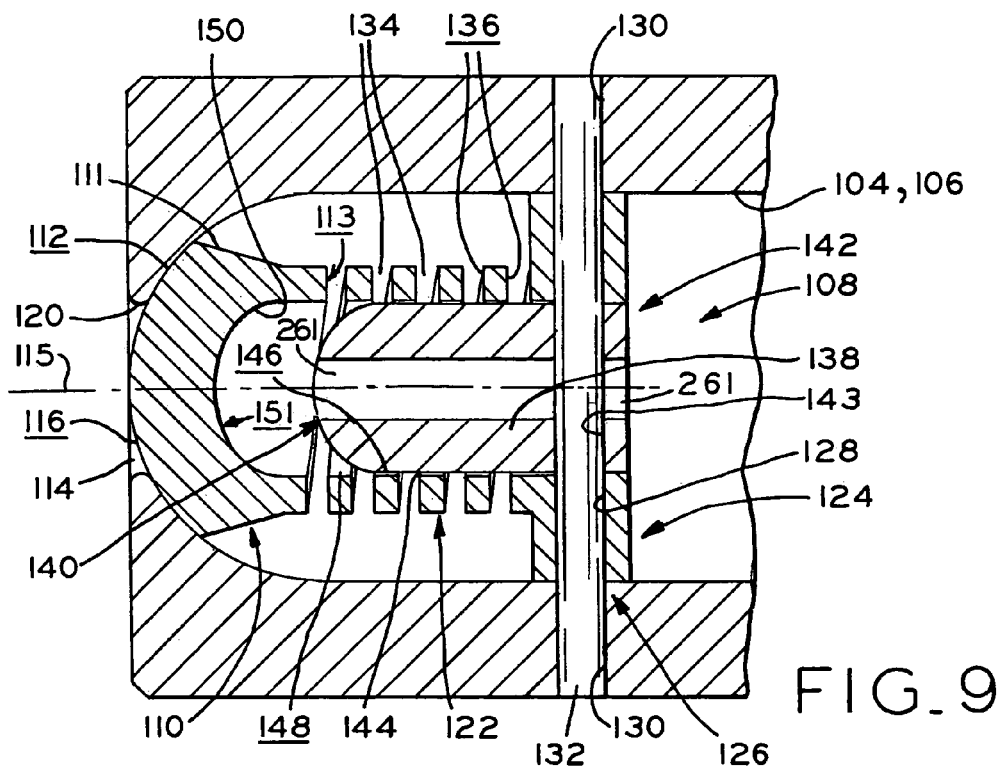
FIG_9
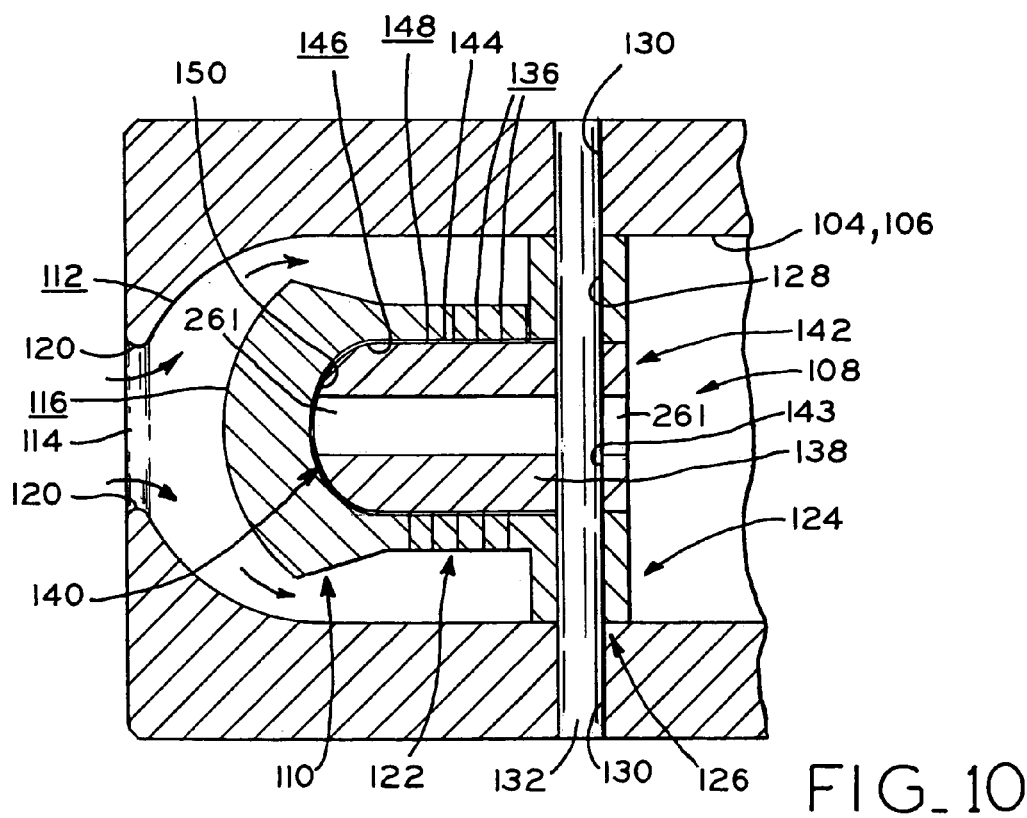
FIG_10

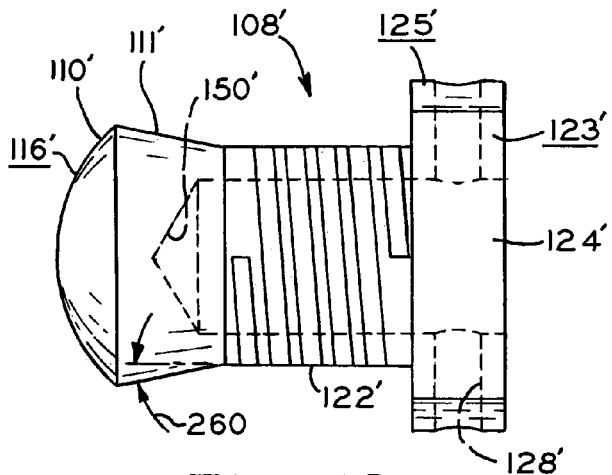
FIG_13
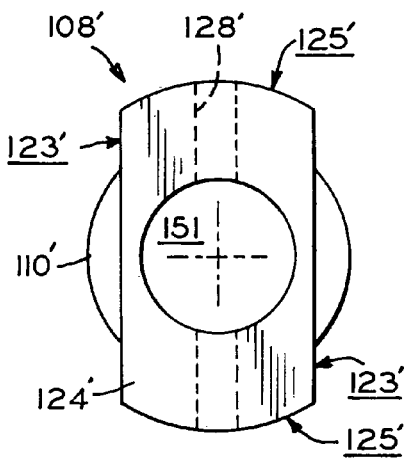
FIG.14
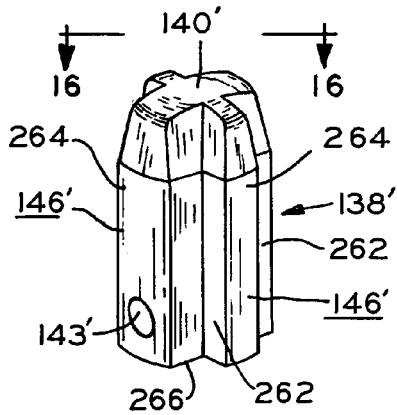
FIG_15
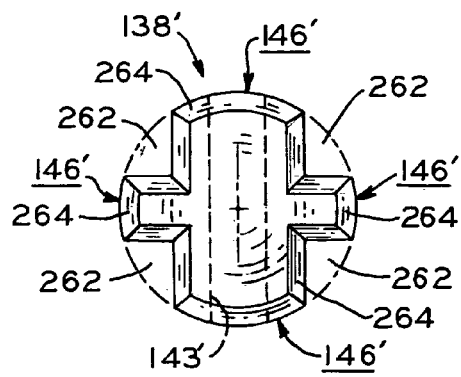
FIG_16
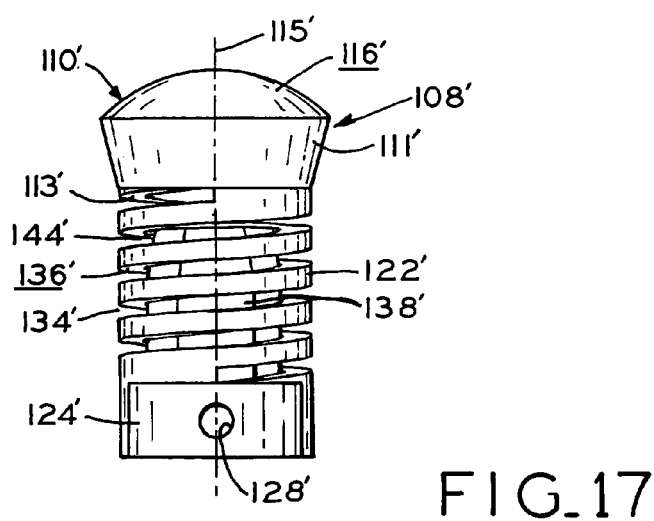
FIG_17

DISCHARGE VALVE FOR COMPRESSOR

CROSS REFERENCE TO RELATED APPLICATIONS

This is a continuation-in-part of application Ser. No. 10/166,646 filed on Jun. 11, 2002 entitled LUBRICATION OF A HERMETIC CARBON DIOXIDE COMPRESSOR the disclosure of which is hereby incorporated by reference.

BACKGROUND OF THE INVENTION

1. Field of the Invention

The present invention relates to compressors and more particularly to discharge valves for a compressor such as a hermetic compressor using carbon dioxide as the working fluid.

2. Description of the Related Art

A wide variety of working fluids have been used with compressor mechanisms. Well known refrigerants that have been widely used in refrigeration and air conditioning equipment include clorofluorocarbons (CFCs) and hydrochlorofluorocarbon (HCFC). Carbon dioxide has also been used as the working fluid in refrigeration and air conditioning systems. The use of carbon dioxide as the working fluid can provide environmental and cost advantages but requires higher compression pressures which can present various operational challenges not found with more conventional refrigerants.

The higher pressures required by carbon dioxide impacts the performance of the discharge valve used to control the discharge of compressed working fluid from a compressor mechanism. The ability of the discharge valve to resist the stress caused by repeated movement and collision with the valve seat is a key characteristic that determines the performance of the valve. Compressors using carbon dioxide as the working fluid may operate at pressures up to 2000 psi and the pressure difference on opposite sides of the valve may be 5 to 10 times the typical pressure difference when using a conventional HCFC refrigerant. Using a two stage compressor mechanism wherein one compression mechanism compresses the vapor from a suction pressure to an intermediate pressure and a second compression mechanism compresses the vapor from the intermediate pressure to a final pressure may help to reduce the loads placed upon the discharge valve. Even when a two-stage compressor is used, however, the relatively high pressures required when using carbon dioxide as the working fluid will often be damaging to a conventional discharge valve having a leaf or reed valve construction. It is also known to use a spring to bias a spherical (ball) or semispherical shaped valve into engagement with the valve seat to provide a discharge valve for a compressor operating under severe conditions. A separate retaining element is typically used to secure the spring. Such valves, however, can be difficult or time consuming to assemble due to their multiple parts and may also present durability concerns. For these reasons, an improved discharge valve construction is desirable.

SUMMARY OF THE INVENTION

The present invention provides a discharge valve for a compressor assembly that is well adapted for use with a working fluid, such as carbon dioxide, that must be compressed to a relatively high pressure.

The present invention comprises, in one form thereof, a compressor assembly including a compressor mechanism having a block a compression chamber and a discharge chamber wherein the block at least partially defines the compression chamber. A discharge port is disposed in the block and provides fluid communication between the compression chamber and the discharge chamber. A valve seat surface is formed on the block and circumscribes the discharge port. Also included is a discharge valve member having a valve head, a biasing section and a valve support wherein each of the valve head, the biasing section and the valve support are portions of a single integrally formed part. The valve head is sealingly engageable with the valve seat surface with the biasing section biasing the valve head toward the valve seat surface. The valve support has a valve support opening extending therein and an elongate non-threaded coupling member having a first end and an opposite second end extends through the valve support opening and the first end is mounted in the block thereby securing the discharge valve member to the block.

In various embodiments of the invention, the block may be the cylinder block, outboard bearing, main bearing or other suitable block of material. The coupling member may extend through the valve support in a lateral direction substantially perpendicular to the longitudinal direction in which the biasing section biases the valve head and the coupling member may also include a second end that is mounted in the block. In another embodiment, the compression chamber is a cylindrical chamber defined within the block, the compressor mechanism is a rotary compressor mechanism and the block defines a discharge passage in fluid communication with the discharge port and forms a portion of the discharge chamber with the valve discharge member being mounted within the discharge passage. The valve support has an outer surface wherein a portion of the outer surface engages the discharge passage and a portion of the outer surface is spaced from the discharge passage to define a fluid passage therebetween.

The valve head may advantageously have a first surface sealingly engageable with the valve seat surface wherein the first surface has a substantially convex shape and the valve seat surface has a substantially concave shape. The first surface and the valve seat surface may also each be substantially shaped to define a portion of a sphere and the radii of each of these surfaces may be substantially equivalent. The operation of the compressor mechanism may create a maximum pressure differential between the compression chamber and the discharge chamber of at least about 500 psi as may be found in a two stage compressor when compressing refrigerants such as carbon dioxide that must be compressed to a relatively high pressure.

The invention comprises, in another form thereof, a compressor assembly including a compressor mechanism having a compression chamber and a discharge chamber. A discharge port provides fluid communication between the compression chamber and the discharge chamber with a valve seat surface circumscribing the discharge port. Also provided is a discharge valve member having a valve head, a biasing section and a valve support wherein the valve support is mounted to the compressor mechanism and the biasing section biases the valve head in a longitudinal direction toward the valve seat surface. The valve head has a first surface wherein the first surface has a substantially convex shape and is sealingly engageable with the valve seat surface. A guide member extends in the longitudinal direction and is engageable with the biasing section wherein engagement of the guide member and biasing section limits lateral movement of the valve head to lateral positions wherein the valve head is sealingly engageable with the valve seat surface. The guide member is spaced from the valve head when the valve head is sealingly engaged with the valve seat surface.

In one embodiment, the discharge valve member is mounted to the compressor mechanism by a non-threaded elongate coupling member extending through a laterally extending opening in the valve support wherein pivotal movement of the biasing section relative to the coupling member is limited by the guide member. The biasing section may advantageously circumscribe the guide member with the guide member being engageable with a radially inner surface of the biasing section. The valve head may have a second surface disposed opposite the first surface and facing the guide member with the guide member including at least one longitudinally extending passageway in fluid communication with the discharge chamber and extending to a distal end of the guide member proximate the valve head. For example, the guide member may include a plurality of longitudinally extending recesses extending to a distal end of said guide member proximate the valve head with the valve head having a second surface disposed opposite the first surface, facing the guide member and having a substantially concave shape.

The invention comprises, in yet another form thereof, a compressor assembly including a compressor mechanism having a compression chamber and a discharge chamber. A discharge port provides fluid communication between the compression chamber and the discharge chamber with a valve seat surface circumscribing the discharge port wherein the valve seat surface includes an inner radial perimeter defining a discharge port area. Also provided is a discharge valve member having a valve head, a biasing section and a valve support, wherein the valve head, the biasing section and the valve support are portions of a single integrally formed part. The valve support is mounted to the compressor mechanism with the biasing section biasing the valve head in a longitudinal direction toward the valve seat surface wherein the longitudinal direction is perpendicular to a plane containing the discharge port area. The valve head has a first surface sealingly engageable with the valve seat surface and a second surface disposed opposite the first surface wherein the first surface defines a substantially convex surface and the second surface defines a substantially concave surface. The second surface is exposed to fluid within the discharge chamber and extends radially outwardly of the discharge port whereby, in a plane oriented perpendicular to the longitudinal direction, the second surface defines an effective area greater than the discharge port area.

One advantage of certain embodiments of the present invention is that a discharge valve member that has a valve head, a biasing section and a valve support formed out of a single integral part and is mounted to a block, e.g., the cylinder block, of a compressor mechanism provides a robust and reliable discharge valve for a compressor mechanism having a relatively high discharge pressure.

Another advantage of various embodiments of the present invention is that by providing a discharge valve member having a valve head and biasing section and a guide member that is engageable with the biasing section of the discharge valve member but that remains spaced from the valve head when the valve head is engaged with the valve seat surface, the rear surface of the valve head may be exposed to fluid within the discharge chamber when the valve head is engaged with the valve seat and/or nearly engaged with the valve seat thereby facilitating the closure and sealing of the valve.

Yet another advantage of certain embodiments of the present invention is that by providing a discharge valve member wherein the valve head has a first surface engageable with the valve seat and a second surface disposed opposite the first surface and wherein the first surface defines a substantially convex surface and the second surface defines a substantially concave surface wherein the second surface is exposed to fluid within the discharge chamber and extends radially outwardly of the discharge port whereby the second surface defines an effective area greater than the discharge port area, the fluid pressure acting on the rear surface of the valve head facilitates the closure and sealing of the valve.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 1 is a sectional side view of a compressor assembly in accordance with the present invention;

FIG. 2 is a sectional view of a cylinder block of the compressor assembly of FIG. 1;

FIG. 3 is a sectional view of the cylinder block of FIG. 2, showing an alternative intake passage;

FIG. 4 is a fragmentary sectional view of the compressor assembly of FIG. 1, showing the upper compression mechanism having an alternative intake passage;

FIG. 5 is a fragmentary sectional view of the compressor assembly of FIG. 1, showing the lower compression mechanism;

FIG. 6A is a top plan view of a thrust bearing having lubrication grooves therein;

FIG. 6B is a side view of the thrust bearing of FIG. 6A taken along line 6B—6B.

FIG. 7 is a side view of a discharge valve of the compressor assembly of FIG. 1;

FIG. 8 is perspective view of the discharge valve of FIG. 7;

FIG. 9 is a sectional side view of a discharge valve assembly of a compression mechanism of the compressor assembly of FIG. 1, shown in its closed position;

FIG. 10 is sectional side view of the discharge valve assembly of FIG. 9, shown in its open position;

FIG. 13 is a side view of another embodiment of a discharge valve;

FIG. 14 is an end view of the discharge valve of FIG. 13;

FIG. 15 is a perspective view of another embodiment of a guide member;

FIG. 16 is a top view of the guide member of FIG. 15; and

FIG. 17 is a side view of the discharge valve of FIG. 13 and guide member of FIG. 15 assembled together.

Figure 11:
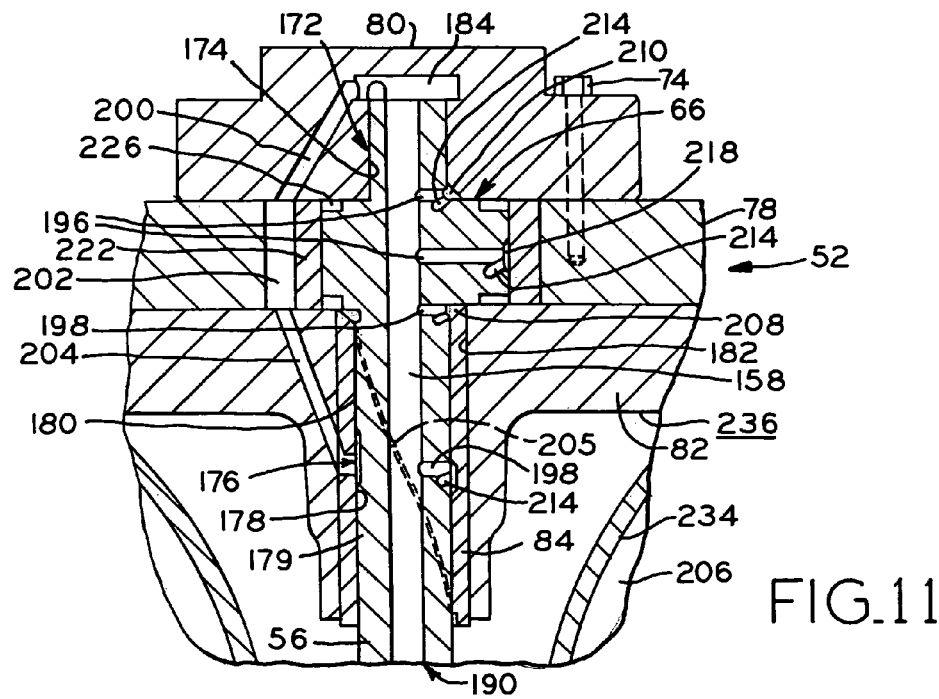
FIG. 11 is a fragmentary sectional view of the upper drive shaft of the compressor assembly of FIG. 1.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PRESENT INVENTION

Referring to FIG. 1, positive displacement, two stage rotary hermetic compressor 20 includes lower end compression module 22 and upper end compression module 24 which are coaxially coupled to opposite axial ends of the electric motor module 26. Compression modules 22 and 24 are affixed to motor module 26 using welds 28 or any other suitable method including brazing or the like. Compression modules 22 and 24 are hermetically sealed by caps 30 and 32 which are secured to substantially cylindrical compression mechanism housing walls 34 and 36, respectively, by welds 28, for example. Lower housing wall 34 further includes annular flange 38 extending substantially perpendicularly from the outer surface thereof. Annular flange 38 is provided to support compressor 20 in a substantially vertical position.

The working fluid used for the refrigeration system of the present invention may be carbon dioxide, for example. When carbon dioxide is used, the pressures produced are significantly greater than those produced when using HCFC refrigerant. In order to accommodate for the high working pressures of carbon dioxide, walls 36 of upper compression module 24 are constructed to be thick enough to withstand the higher pressure gas. Walls 36 are thicker than walls 34 of lower compression module 22 as the pressures produced during the first stage of compression are substantially lower than produced during the second stage of compression.

The use of carbon dioxide in commercial, residential, automotive, and military applications has been analyzed and the results presented in a publication by Kruse H., Hedelck R., and Suss J., "The Application of Carbon Dioxide as a Refrigerant", IIR Bulletin, Vol. 1999-1, and pp. 2–21. Additionally, a publication by Lorenz, G., et al., "New Possibility for Non-CFC Refrigeration", Proc. IIR, 1992, vol. 21, no. 3, pp. 147–163 discusses further applicability of carbon dioxide.

Located within electric motor module 26 is electric motor 40 including stator 42 and rotor 44. Stator 42 is interference fitted within cylindrical housing 43 of module 26 at substantially the axial center thereof by a method such as shrink fitting, for example. Axial cylindrical aperture 46 is located centrally through rotor 44 for receiving cylindrical sleeve 62 disposed about drive shaft 48 which is mounted therein for rotation with rotor 44. The lower and upper ends of drive shaft 48 are drivingly connected to first and second stage compression mechanisms 50 and 52 housed in lower and upper end compression modules 22 and 24, respectively.

Drive shaft 48 is constructed from lower drive shaft 54 and upper drive shaft 56. Integrally formed near the joint ends of drive shafts 54 and 56 are keys 58 and 60, respectively. Keys 58 and 60 are cut to form a semi-cylindrical end, which slidingly interlock to rotatably fix the lower and upper drive shafts and form the complete cylinder of drive shaft 48. Cylindrical sleeve 62 is mounted onto drive shaft 48 by any suitable method including shrink fitting, over the coupling between lower and upper drive shafts 54 and 56. Sleeve 62 is interference fitted within aperture 46 for rotation with rotor 44. Integrally formed near the outer ends of drive shafts 54 and 56 are eccentric portions 64 and 66, respectively. Drive shafts 54 and 56 are coupled to one another such that eccentric portions 64 and 66 are radially offset by 180° to achieve better dynamic balance and motor loading.

Referring to FIGS. 1, 4, and 5, first stage compression mechanism 50 and second stage compression mechanism 52 are mounted within modules 22 and 24. The modular design provides motor 40 and compression mechanisms 50 and 52 with individual housings, each being maintained at a substantially different pressure. The modular design also reduces the cost of assembly of compressor 20 and facilitates flexibility of design by providing respective modules 22 and 24 of different capacities.

As shown in FIGS. 1 and 5, first stage compression mechanism 50 includes cylinder block 68 located between outboard bearing 70 and frame or main bearing 72 which is integrally formed with housing walls 34. Fasteners 74 extend through outboard bearing 70 and cylinder block 68 to secure bearing 70 and cylinder block 68 to main bearing 72. Lower drive shaft 54 is rotatably mounted in main bearing 72 by journal 76. As illustrated in FIGS. 1 and 4, second stage compression mechanism 52 includes cylinder block 78 located between outboard bearing 80 and frame or main bearing 82 which is integrally formed with housing walls 36. Fasteners 74 secure outboard bearing 80 and cylinder block 78 to main bearing 82. Upper drive shaft 56 is mounted in main bearing 82 by journal 84. Eccentric portions 64 and 66 of drive shafts 56 and 58 are received in cylinder blocks 68 and 78 to drive compression mechanisms 50 and 52.

Referring to FIGS. 1, 6A, and 6B, located between sleeve 62 and upper planar surface 98 of main bearing 72 is circular thrust bearing 100 provided to accept axial loading. Thrust bearing 100 is provided with aperture 101 through which drive shaft 48 extends when assembled thereto. Circular thrust bearing 100 is constructed from any suitable material having a sufficiently low coefficient of static and kinetic friction so that rotation of sleeve 62 and thus drive shaft 48 is not hindered. Lubrication oil is delivered to the thrust-bearing surface through grooves (not shown) in main bearing 72, thereby further reducing the coefficient of friction during compressor start-up and operation. The circular shape of thrust bearing 100 helps to form a circumferential, continuous pattern of the oil film between the thrust surfaces which prevents metal-to-metal contact.

In order to determine the type of material appropriate for thrust bearing 100, the pressure-velocity (PV) loading of the thrust bearing can be used. The pressure-velocity (PV) loading may be computed for numerous external and internal diameters. The following parameters are used in these calculations:

$$P = 4W/B(D_o^2 - d_i^2)$$

where P is the static loading per unit area, psi (kg/cm$^2$); W is the static load acting on thrust bearing 100, lb (kg). Referring to FIGS. 6A and 6B, $D_o$ is the outer diameter and $d_i$ is the inner diameter of thrust bearing 100, in (cm). The static loading per unit area (P) is first calculated using the above equation. In order to calculate the surface velocity (V) of thrust bearing 100, the following equation is used:

$$V = B(D_m N)$$

where V has the units in/min (cm/min); N is the speed of rotation of thrust bearing 100, rpm (cycles/min), which rotates with drive shaft 48; $D_m$ is the average diameter, in (cm), calculated by the following equation:

$$\frac{D_o + d_i}{2}.$$

The Pressure-Velocity loading of thrust bearing 100 is then calculated by multiplying the static loading per unit area (P)

and surface velocity (V) to get the pressure-velocity loading (PV), psi-ft/in$^2$ min (kg-M/cm$^2$ sec). These calculations are then used to select an appropriate material for bearing 100.

One type of suitable material for thrust bearing 100 includes a polyamide such as VESPEL SP-21, which is a rigid resin material available from E. I. DuPont de Nemours and Company. The polyamide material has a broad temperature range of thermal stability, capable of withstanding approximately 300,000 lb. ft/in. with a maximum contact temperature of approximately 740° F. (393° C.) when unlubricated. For a machined thrust bearing 100 constructed from a material such as VESPEL, the allowable pressure (P) should not exceed 6,600 psi. The PV limit for unlubricated bearing under conditions of continuous motion should not exceed 300,000 lb ft/in$^2$ min. In this embodiment of the present invention, the ratio of the outside diameter to the inside diameter (D/d) of thrust bearing 100 should not exceed 2.

Thrust bearing 100 is provided with radially extending grooves 102 on both surfaces of bearing 100 in contact with surface 98 of main bearing 72 and sleeve 62. Grooves 102 are provided in thrust bearing 100 for communicating lubricating oil between thrust bearing 100 and the interfacing surfaces.

Referring to FIGS. 1, 4, and 5, first and second stage compression mechanisms 50 and 52 are illustrated as rotary type compression mechanisms, however, compression mechanisms 50 and 52 may be reciprocating, rotary, or scroll type compressors. Rotary compressors generally include a vane slidingly mounted in the cylinder block, which divides compression chamber 118 located between cylinder blocks 68, 78 and rollers 220, 222 surrounding eccentrics 64, 66 of drive shafts 54, 56. The vane reciprocates into and out of the cylinder block as it orbits about the drive shaft. Referring to FIG. 2, cylinder block 68 is provided with aperture 86 in which eccentric portion 64 surrounded by roller 220 is received. Radially extending from aperture 86 is intake passage 88 through which gas to be compressed is drawn into compression chamber 118. Once the refrigerant gas is compressed to a higher pressure, it is discharged through radially extending discharge passage 104. Alternatively, as shown in FIG. 3, the intake passage may be located substantially axially to aperture 86 such as intake passage 92. Referring to FIG. 1, refrigerant gas is drawn into compression chamber 118 defined in upper cylinder block 78 via axially oriented inlet passage 94 extending through main bearing 82. Alternatively, refrigerant gas may be provided to compression chamber 118 of second stage compression mechanism 52 via radial tube 96 as shown in FIG. 4. Discharge pressure gases exit compression mechanism 52 through axially extending passage 106.

Referring to FIGS. 1 and 2, cylinder block 68 of first stage compression mechanism 50 is provided with radially extending discharge passage 104 having discharge valve 108 mounted therein. As shown in FIG. 1, outboard bearing 80 of second stage compression mechanism 52 is provided with discharge passage 106 which extends axially therethrough. Even though discharge passages 104 and 106 are illustrated as being directed radially and axially through cylinder block 68 and outboard bearing 80, respectively, the discharge passages may be in any suitable configuration through any of the cylinder block, outboard bearing, or main bearing.

Referring to FIGS. 1, 7, 8, 9, and 10, a discharge valve 108 is mounted in each discharge passage 104 and 106. During compressor operation, discharge valves 108 reciprocate within discharge passages 104 and 106 so that discharge gases may pass through passages 104 and 106 and around valves 108. These discharge gases are then released into discharge tube 152 extending from first stage compression mechanism 50 or discharge pressure compartment 154 formed in upper compression mechanism module 24, for example. As used herein, a discharge chamber refers to a space which receives compressed fluids discharged from a compressor mechanism at discharge pressure, which for the first stage compressor mechanism of a two stage compressor is an intermediate pressure, without requiring a specific shape or size for the chamber and, thus, in the illustrated embodiment includes discharge passage 104 and discharge tube 152 in addition to discharge passage 106 and discharge pressure compartment 154.

Discharge valve member 108 is an integral one piece valve-spring-retainer assembly formed from one piece of material having semi-spherical head portion 110, a biasing section formed by rectangular wire spring 122, and valve support 124 including coupling attachment 126. Discharge valve 108 is formed from a single piece of material having elasticity, fatigue, and corrosion resistance qualities. The material also has spring-like qualities so that spring 122 may be biased into a closed position to allow valve 108 to open and also exert a biasing force urging valve 108 into a closed position with head portion 110 engaged with valve seat 112. Materials possessing such characteristics may include high strength materials such as 17-4PH corrosion resistant steel, 15-5 PH, C-300, BETA C Titanium, 7075-T6 Aluminum, or like. Other forms of biasing sections that allow for the reciprocating movement of valve head 110 may also be used.

Integral discharge valve 108 includes a convex, semi-spherically shaped head portion 110 which faces concave, semi-spherically shaped seating surface 112 (FIGS. 9 and 10) formed on the interior of the outlet end of discharge passages 104 and 106. Semi-spherical seating surface 112 provides a valve seat for discharge valve 108 and defines cylindrically shaped outlet or discharge port 114 (FIGS. 9 and 10) operable by discharge valve 108. Semi-spherical valve head portion 110 includes sealing surface 116 which engages semi-spherical seating surface 112, substantially filling outlet 114 when in a closed position (FIG. 9), thereby reducing the gas reexpansion volume of the outlet 114.

That portion of semi-spherical sealing surface 116 spanning discharge port 114 when valve 108 is in a closed position (FIG. 9) faces compression chamber 118 of compression mechanisms 50 and 52 and is exposed to fluid pressure generated within compression chambers 118 during compressor operation. When valves 108 are in an open position (FIG. 10) fluid flows past spherical surface 116 through discharge passages 104, 106. The semi-spherical shape of sealing surface 116 reduces the turbulence of fluids flowing past surface 116 after being discharged through outlet 114 relative to a flat substantially planar discharge valve thereby increasing compressor efficiency. The use of inclined shoulder 111 also facilitates the reduction of turbulence in the fluids flowing past valve 108.

Semi-spherical valve seat 112 has substantially the same radius of curvature as that of spherical sealing surface 116, so that shifting, cocking, tilting or other dislocations of discharge valve 108 relative to valve seat 112 will not affect sealing contact during valve closing. The radial inner edge of discharge outlet 114 has round chamfer 120 (FIGS. 9 and 10) which helps to smooth fluid flow through discharge outlet 114, reducing turbulence that may affect compressor efficiency.

Discharge valve 108 is fixed inside discharge passages 104 and 106 by coupling attachment 126 affixed to valve support 124. Coupling attachment 126 includes bore 128 extending laterally through valve support 124 which is aligned with bores 130 in cylinder block 68 or outboard bearing 80 to receive a coupling member such as non-threaded spring pin 132 and is oriented substantially perpendicular to longitudinal axis 115. Spring pin 132 secures a discharge valve 108 within passages 104 and 106 such that valve spring 122 is slightly prestressed to prevent leakage during the gas compression process. Discharge valve 108 reciprocates along longitudinal axis 115 between a first, closed position (FIG. 9) in which sealing surface 116 engages semi-spherical seating surface 112 and a second, open position (FIG. 10) with sealing surface 116 spaced longitudinally away from seating surface 112. During valve opening and compression of spring 122, the longitudinal movements of the discharge valve 108 toward the second position stops when gaps 134, having normally separated facing surfaces 136, of rectangular wire spring 122 are closed.

Guide member 138 may be provided to guide and maintain the longitudinal movement of spring 122, when the compression load applied to rectangular wire spring 122 is high, for example. Guide member 138 is substantially cylindrically shaped having a diameter smaller than the inner diameter of spring 122. Distal end 140 of guide member 138 is rounded and may form a valve stop by engaging valve head 110 and limiting the movement of valve head 110 prior to the complete compression of spring 122. Rear end 142 of guide member 138 has bore 143 drilled therethrough which is aligned with bores 128 and 130 to receive a portion of spring pin 132. The alignment of bores 128, 130, and 143 to receive pin 132 provides for easy assembly of discharge valve 108 and guide member 138 within the respective cylinder block, main bearing, or outboard bearing. A longitudinal channel 261 extends through the body of guide member 138 and defines a fluid passageway that communicates discharge gas to cavity 150 where it acts upon rear surface 151. Channel 261 is shaped such that discharge gas is communicated around pin 132. Clearance space 144 is provided between outer surface 146 of guide member 138 and radially inner surface 148 of spring 122. Clearance space 144 permits predetermined pivotal movements of valve spring 122 without friction which can delay opening and closing of the valve.

A spherical or conical cavity 150 is formed in the backside of discharge valve 108. Cavity 150 reduces the weight of valve head 110 and the discharge valve 108 as a whole. Cavity 150 also facilitates the exposure of the rear surface of valve head 110 to fluid within discharge passages 104, 106 which exerts a backpressure on surface 151 of cavity 150 urging valve head 110 towards a closed position. Head portion 110 is defined on one side by surface 116 which engages valve seat 112 and on its opposite side by shoulder 111 and cavity surface 151. Interconnecting shoulder 111 and cavity surface 151 is a rim surface 113 which is formed in part by the end portion of biasing section 122 which at one end merges with rim 113. In the illustrated embodiment, the radially outermost limit of head portion 110 is defined by the junction of spherical surface 116 and shoulder 111 and extends radially outwardly of discharge port 114. Substantially all of the surface area of head portion 110 which faces away from discharge port 114, i.e., the surface area defined by shoulder 111, rim 113 and cavity surface 151 is exposed to fluid within the discharge chamber 104 or 106 (FIG. 7). The pressure of the fluid within the discharge chamber 104 or 106 thus acts on shoulder 111, rim 113 and cavity surface 151 to bias valve head 110 towards valve seat 112. The effective surface area over which this pressure acts to bias valve head 110 in a longitudinal direction toward valve seat 112 is the area defined by the boundary between surface 116 and shoulder 111 as measured in a plane oriented perpendicular to longitudinal axis 115. As best seen with reference to FIG. 9, this effective area is larger than the area of discharge port 114 as measured in a plane oriented perpendicular to longitudinal axis 115 and which defines the surface area of spherical surface 116 exposed to fluids within the compression chamber when valve 108 is in the closed position illustrated in FIG. 9. Providing an effective surface area on valve head 110 that is exposed to fluid within discharge passages 104, 106 for biasing valve head 110 into a closed position that is larger than the surface area of the discharge port 114 facilitates the effective sealing of valve head 110 against valve seat 112 when valve 108 is in the closed position.

In operation, valve head 110 is biased away from valve seat 112 into an open position near the end of the compression cycle as the piston approaches discharge port 114 and compressed carbon dioxide is thereby expelled from the compression chamber. Valve head 110 is biased into a closed position as the piston begins the intake stroke filling the cylinder with carbon dioxide at the suction pressure. In the illustrated embodiment, the first stage compressor mechanism receives carbon dioxide gas at a pressure of approximately 600 psi and the carbon dioxide gas is discharged from the compressor mechanism at a pressure of approximately 1100 psi. Thus, the pressure differential acting on valve head 110, i.e., the difference in pressure on surface 116 and cavity surface 151, at the beginning of the compression cycle as or shortly after valve head 110 closes may approach 500 psi. The second stage compressor mechanism receives carbon dioxide at approximately 1100 psi and discharges the carbon dioxide at a pressure of approximately 2000 psi. Thus, the pressure differential acting on valve head 110 of the second compressor may be up to approximately 900 psi.

These relatively high pressure differentials increase the speed and force at which valve head 110 impacts valve seat 112. The travel distance of the valve head 110 in the illustrated embodiments is approximately $65/1000$ inch. The spring 122 may have a spring constant of between approximately 10 and 25 pounds/inch. The use of a relatively small travel distance limits the speed and force at which the valve head 110 impacts valve seat 112 and may thereby prolong the life of the valve head 110 and valve seat 112.

An alternative embodiment of the discharge valve member and guide member are illustrated in FIGS. 13–17. Features of the alternative embodiment that are similar to the above-described embodiment are indicated using prime reference characters, e.g., 108' to indicate the alternative embodiment of the discharge valve member. A description of those features which are similar in each of the embodiments can be found above with reference to the first embodiment.

As can be seen in FIG. 13, one difference between the two embodiments of the discharge valve member is that valve member 108' has a cavity 150' that is conically shaped instead of spherically shaped. As can also be seen in FIG. 13, shoulder 111' is inclined at an angle, designated by reference numeral 260, relative to the longitudinal direction to facilitate the smooth flow of discharged fluids through fluid passages 104, 106 around valve head 110a. In the illustrated embodiments, shoulders 111, 111' are inclined at an angle of approximately 11 degrees.

As best seen in FIGS. 15 and 16, guide member 138' includes longitudinally extending recesses 262 that form fluid passageways as discussed below. Guide member 138' includes radially outwardly extending arms 264 disposed between recesses 242 and which have radially outer surfaces 146' that are engageable with the inner radial surface of biasing section 122' to guide the reciprocating movement of valve member 108' along longitudinal axis 115' and prevent the relatively high pressures acting on valve member 108' from laterally displacing valve member 108'. As shown in FIG. 16, the outer perimeter of arms 264 conforms to the general shape of the interior surface of biasing section 122', i.e., a generally circular shape. As with the first embodiment, a clearance 144' is formed between guide member 138' and biasing section 122'.

The clearance 144' between guide member 138' and biasing section 122' allows some limited lateral movement, i.e., movement perpendicular to longitudinal axis 115', of valve head 110', however, the extent of such lateral displacement is limited and valve head 110' and valve seat 112' will still sealingly engage when the valve member 108' has been laterally displaced such that guide member 138' has engaged biasing section 122' to prevent further lateral displacement. The spherical shapes of the valve head surface 116' and valve seat surface 112' also facilitate the sealing engagement of valve head surface 116' with valve seat 112' when valve head 110' has been laterally displaced.

When valve 108' is opening, the movement of valve head 110' away from valve seat 112' may be stopped either by the complete closing of the gaps 134' formed by the spiral element of the biasing section 122' or by the engagement of cavity surface 151' with distal end 140' of guide member 138' depending upon the configuration of the valve assembly. By positioning distal end 140' of guide member 138' such that guide member 138' acts as a valve stop and prevents the full compression of biasing section 122', the life of biasing section 122' may be prolonged.

Such use of guide member 138' as a valve stop will also ensure that gaps 134' remain open in biasing section 122' of valve member 108' when valve head 110' is in an open position. Such gaps facilitate the communication of fluid at a discharge pressure to cavity 150'. Although clearance space 144' provides fluid communication between gaps 134' and cavity 150', the use of recesses 262 provides fluid passageways with greater capacity and enhances the communication of fluid at discharge pressure to cavity 150'. Although the flow of fluid to cavity 150' is enhanced by using guide member 138' as a valve stop such that gaps 134' remain when valve head 110' is in its open position, the end of valve member 108' opposite valve head 110' is open to the discharge passageway 104 or 106 and, thus, fluid would still be able to enter cavity 150' through clearance 144' and recesses 262 if gaps 134' were to be fully closed when valve head 110' was in its open position.

In other embodiments, instead of, or in addition to, using recesses disposed along the outer perimeter of the guide member, the guide member may include a central bore or passage that has an opening at distal end 140' and another opening in fluid communication with discharge passage 104 or 106, such as at the opposite end 266 of the guide member, so that fluid at the discharge pressure may fill the interior passage of the guide member and exert a pressure on cavity surface 151' proximate longitudinal axis 115'.

Figure 12:
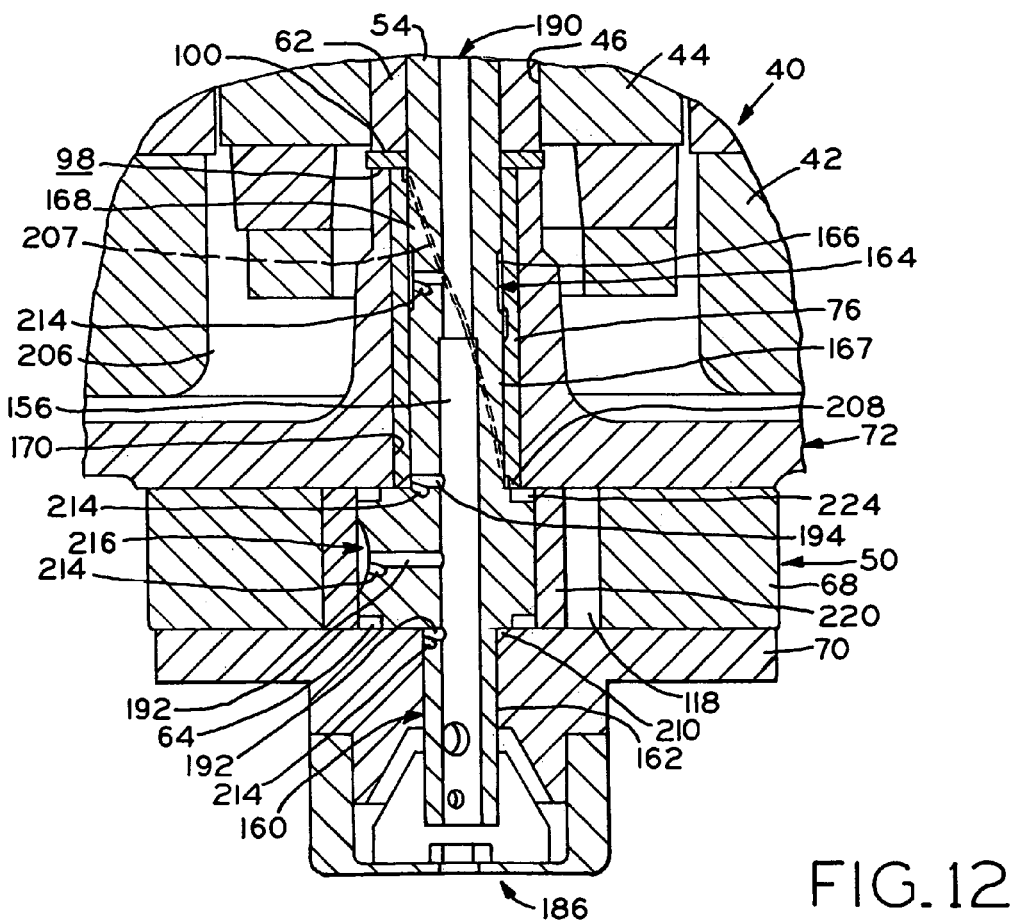
FIG. 12 is a fragmentary sectional view of the lower drive shaft of the compressor assembly of FIG. 1.

Referring now to FIGS. 1, 11, and 12, the lubrication system of the present invention is formed primarily in drive shaft 48, including lower and upper drive shafts 54 and 56 coupled together by sleeve 62. Oil delivery channels 156 and 158 are formed in fluid communication centrally along the axis of rotation through drive shafts 54 and 56, respectively. At the upper end of oil channel 158, formed in outboard bearing 80, is chamber 184. Located at the lower end of lower drive shaft 54 is positive displacement oil pump 186 (FIG. 1) which is operably associated with outboard bearing 70 and oil channels 156 and 158. The lower end of drive shaft 54, outboard bearing 70, and oil pump 186 are submerged in oil sump 188 formed in lower compression module 22. The lubricating oil in sump 188 also supplies oil to the reciprocating vane of compression mechanism 50. Further, the oil in sump 189 of upper end compression module 24 is necessary for providing lubrication to the reciprocating vane of compression mechanism 52.

Referring to FIGS. 11 and 12, lower drive shaft 54 includes portion 160 supportingly received in bore 162 of outboard bearing 70 and oil annulus 164 defined by recessed area 166. Lower and upper journals 167 and 168 are formed on shaft 54 adjacent annulus 164 and are supportingly received in main bearing bore 170 of main bearing 72. Journal 76 is positioned between lower shaft 54 and main bearing bore 170, in contact with journals 167 and 168 to rotatably support shaft 54 in main bearing 72. Upper drive shaft 56 includes portion 172 rotatably received in bore 174 of outboard bearing 80. Oil annulus 176 is defined by recessed area 178 in upper drive shaft 56. Lower and upper journals 179 and 180 are formed on upper shaft 56 adjacent annulus 176 and are supportingly received in main bearing bore 182 of main bearing 82. Journal 84 is positioned between shaft 56 and main bearing bore 182, in contact with journals 179 and 180 to rotatably support shaft 56 in main bearing 82.

Rotation of drive shaft 48 operates positive displacement pump 186 to draw oil from sump 188 into oil supply passageway 190 formed by oil delivery channels 156 and 158 and into chamber 184. The pumping action of pump 186 is dependent upon the rotational speed of drive shaft 48. Oil in oil supply passageway 190 flows into a series of radially extending passages 192 and 194 located in lower shaft 54 by centrifugal force created during rotation of shaft 48. Passages 192 are associated with eccentric 64 and passages 194 are formed in journal 167 and annulus 164. The lubrication oil delivered through oil supply passageway 190 also flows into a series of radially extending passages 196 and 198 located in upper shaft 56 and into chamber 184. Passages 196 are locating in eccentric 66 with one passage 198 being formed in journal 179 and one in oil annulus 176.

Referring to FIG. 11, downwardly inclined channel 200 is formed in outboard bearing 80 extending from chamber 184 to one end of axial channel 202 formed in cylinder block 78 of second stage compression mechanism 52. Extending from a second end of axial channel 202 is downwardly inclined channel 204 formed in main bearing 82 which is in fluid communication with oil annulus 176 defined in upper drive shaft 56. Oil annulus 176 is in fluid communication with helical oil groove 205 formed in the inner wall of journal 84, compartment 206 in electric motor module 26, annular cavity 208 formed in journal 84, and annular cavity 210 formed in outboard bearing 80.

Oil supplied to chamber 184 located at the top end of upper drive shaft 56 flows through channels 200, 202, and 204 to oil annulus 176 and combines with oil supplied by radially extending passage 196. At least a portion of the oil flows upwardly to lubricate upper journal 180 and downwardly to lubricate lower journal 179 through helical journal groove 205. The excess lubricating oil is returned to the oil sump 188 by traveling through electric motor module 26 and passages 212 (FIG. 1) extending through main bearing 72. Referring to FIG. 12, oil passing through oil supply passageway 190 enters radial passage 194 to fill annulus 164.

Helical groove 207 may be formed in journal 76 to direct the lubricating oil in annulus 164 to lower and upper journals 167 and 168.

Due to extended length of oil supply passageway 190, lubrication of lower journal bearings 76, 167, and 168, and particularly upper journal bearings 84, 179, and 180, can be delayed, preventing the formation of an oil film to separate the interfacing bearing surfaces. The expected life of bearings is partially related to the oil film thickness between the interfacing bearing surfaces. The required clearance for mating parts of rotary compressors is in the range of 0.0005 inches to 0.0011 inches, thus the thickness of the oil film is very small. During initial operation of compressor 20, there is no oil film located between the interfacing bearing surfaces and thus, the bearing surfaces are in metal-to-metal contact. During peak load operation of the compressor, the frequency of starting and stopping the compressor is high, and some of the oil used to form the film will return to oil sump 188 due to gravity. A portion of the oil will remain between the interfacing bearing surfaces, however, the amount of oil is not great enough to support formation of adequate film thickness. The contact between the interfacing bearing surfaces will cause locally high stresses resulting in fatigue of the bearing material.

In prior art compressors, oil retaining recesses are used to contain the lubricating oil flowing from the journal surface when the compressor stops frequently, however, these recesses will not provide lubricating oil to the bearings at start-up. Further, the prior art compressors have been provided with circumferential grooves which form the oil retaining recesses. These grooves may weaken the drive shaft.

In order to provide lubricating oil to the interfacing bearing surfaces during initial start-up and frequent starting and stopping of the compressor, drive shafts 54 and 56 of the present invention are provided with oil accumulating cylindrical cavities 214. Cavities 214 are formed in drive shafts 54 and 56 being inclined downwardly from the external oil deliver end of radially extending passages 192, 194, 196, and 198. Cavities 214 are "blind" bores meaning that the bores do not extend completely through drive shafts 54 and 56 and are not in fluid communication with oil supply passageway 190. Cavities 214 are located beneath with each radially extending passage 192, 194, 196, and 198 with the opening of each cavity 214 being at least partially located in one of the radially extending passages. Cavities 214 and passages 192, 194, 196, and 198 are radially aligned with the passage being located directly above the cavity.

The outlet part of each radially extending passages 192, 194, 196, and 198 is fluid communication with annular recess cavities 208, 210, oil annulus recesses 164, 176, and cavities 216, 218. Cavities 216, 218 are formed between rollers 220, 222 and eccentrics 64, 66. Rollers 220, 222 are mounted to drive shafts 54, 56 in surrounding relationship of eccentrics 64, 66 to help drive compression mechanisms 50, 52. When the compressor is stopped, the oil accumulated in the cavities 208, 210, 164, 176, 216, and 218 will tend to flow downwardly due to gravity. A portion of the oil collected in cavities 208, 210, 164, 176, 216, and 218 will be directed to the oil sump 188 while a portion of the oil in these cavities will be directed to oil accumulating cavities 214. During start-up of compressor 20, lubricant stored in cavities 214 is drawn out of cavities 214 by centrifugal force to supply lubrication to the interfacing bearing surfaces before the oil being forced through oil supply passageway 190 by oil pump 186 can reach these surfaces. Additionally, upper compression module 24 is charged with lubricating oil during compressor assembly which also provides compression mechanism 52 with lubrication during compressor start-up. This eliminates the metal-to-metal contact between bearing surfaces at start-up and improves reliability of the compressor. Oil accumulating recesses 224 and 226 are formed in the upper planar surfaces of lower and upper shaft eccentrics 64 and 66 to receive oil as the compressor stops. The oil in recesses 224 and 226 is immediately supplied to the contacting surfaces of rollers 220, 222 and eccentrics 64, 66 at compressor start-up.

Referring to FIG. 1, during compressor operation, the flow of fluid through compressor 20 is as follows. Low pressure suction gas is supplied directly to first stage compression mechanism 50 of lower end compression module 22 via suction inlet 88 or 92 (FIGS. 2 and 3). As drive shaft 48 rotates, compression mechanism 50 is driven to compress the low pressure suction gas to an intermediate pressure. The intermediate pressure gas is discharged through discharge port 90 (FIG. 2), past discharge valve 108 in discharge passage 104 and into discharge tube 152. The intermediate pressure gas flows along tube 152 into a unit cooler (not shown) located outside of the compressor casing. Subsequently, the cooled intermediate pressure refrigerant gas is introduced into compartment 206 of electric motor module 26 through inlet tube 228. Compartment 206 is in fluid communication with compartment 230 of lower end compression module 22 through oil passages 212, which allow oil to be reclaimed by oil sump 188. Introduction of the cooled refrigerant gas into electric motor compartment 206 helps to cool electric motor 40. Further, by cooling the intermediate pressure gas, the amount of heat transfer between the lubricant and the refrigerant gas is reduced due to the minimal temperature difference between the two fluids. Conically shaped baffle 234 separates incoming lubricating oil from the intermediate pressure gas entering upper compression module 24 and prevents suction port 94 formed in main bearing 82 from direct suction of oil coming from motor stator-rotor gap 238. Baffle 234 is secured to surface 236 of main bearing 82, being concentric with drive shaft 48. The intermediate pressure refrigerant gas entering second stage compression mechanism 52 is compressed to a higher, discharge pressure. The high pressure gas is then discharged past discharge valve 108 located in discharge passage 106 into high pressure discharge compartment 154 defined in upper end compression module 24 and through discharge tube 242 mounted in cap 32 to the refrigeration system (not shown). Outboard bearing 80 acts to separate oil supply passageway 190 and chamber 184 from the high pressure fluid in cavity 150. The high pressure, discharge gas from second stage compression mechanism 52 contains some oil. A portion of this oil is separated from the discharge gas and is trapped in oil sump 189 of upper end compression module 24 before the gas is discharged through gas inlet 241 located at the inner end of tube 242. Discharge tube 242 includes a series of inlet holes 244 and bleed hole 246 located near the bottom of tube 242. As oil level in the sump reaches the height of bleed hole 246, gas inlet 241 is submersed in the oil. The discharge pressure gas then enters discharge tube 242 through inlet holes 244. Oil is aspirated through hole 246 and into discharge tube 242 under action of the discharge flow through inlet holes 244.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A compressor assembly comprising:
   a compressor mechanism having a block, a compression chamber and a discharge chamber, said block at least partially defining said compression chamber;
   a discharge port disposed in said block and providing fluid communication between said compression chamber and said discharge chamber;
   a valve seat surface formed on said block and circumscribing said discharge port;
   a discharge valve member having a valve head, a biasing section and a valve support wherein each of said valve head, said biasing section and said valve support are portions of a single integrally formed part, said valve head being sealingly engageable with said valve seat surface, said biasing section biasing said valve head in a longitudinal direction toward said valve seat surface and said valve support having a valve support opening extending therein, said valve support opening extending in a lateral direction oriented substantially perpendicular to said longitudinal direction; and
   an elongate non-threaded coupling member having a first end and an opposite second end, said first end being mounted in said block and said elongate coupling member extending through said valve support opening thereby securing said discharge valve member to said block.

2. The compressor assembly of claim 1 wherein said coupling member extends through said valve support and said second end is mounted in said block.

3. The compressor assembly of claim 1 wherein said valve head has a first surface sealingly engageable with said valve seat surface, said first surface having a substantially convex shape and said valve seat surface having a substantially concave shape.

4. The compressor assembly of claim 3 further comprising a guide member engageable with said biasing section and positioned to limit movement of said discharge valve member relative to said valve seat surface.

5. The compressor assembly of claim 3 wherein said first surface and said valve seat surface are each substantially shaped to define a portion of a sphere.

6. The compressor assembly of claim 5 wherein said first surface and said valve seat surface have a substantially equivalent radius.

7. The compressor assembly of claim 1 wherein operation of said compressor mechanism creates a maximum pressure differential between said compression chamber and said discharge chamber of at least about 500 psi.

8. The compressor assembly of claim 1 wherein said compression chamber is a cylindrical chamber defined within said block, said compressor mechanism is a rotary compressor mechanism and wherein said block defines a discharge passage in fluid communication with said discharge port and forming a portion of said discharge chamber, said valve discharge member being mounted within said discharge passage, said valve support having an outer surface, a portion of said outer surface engaging said discharge passage and a portion of said outer surface being spaced from said discharge passage to define a fluid passage therebetween.

9. A compressor assembly comprising:
   a compressor mechanism having a compression chamber and a discharge chamber;
   a discharge port providing fluid communication between said compression chamber and said discharge chamber;
   a valve seat surface circumscribing said discharge port;
   a discharge valve member having a valve head, a spring biasing section and a valve support, wherein each of said valve head, said biasing section and said valve support are portions of a single integrally formed part, said valve support being mounted to said compressor mechanism by a non-threaded elongate coupling member extending through a laterally extended opening in said valve support;
   said biasing section biasing said valve head in a longitudinal direction toward said valve seat surface and said valve head having a first surface, said first surface having a substantially convex shape and being sealingly engageable with said valve seat surface; and
   a guide member extending in said longitudinal direction, said guide member engageable with said biasing section wherein engagement of said guide member and biasing section limits lateral movement of said valve head to lateral positions wherein said valve head is sealingly engageable with said valve seat surface, said guide member being spaced from said valve head when said valve head is sealingly engaged with said valve seat surface.

10. The compressor assembly of claim 9 wherein said valve seat surface has a substantially concave shape.

11. The compressor assembly of claim 10 wherein said first surface and said valve seat surface are each substantially shaped to define a portion of a sphere.

12. The compressor assembly of claim 11 wherein said first surface and said valve seat surface have a substantially equivalent radius.

13. The compressor assembly of claim 9 wherein said biasing section circumscribes said guide member and said guide member is engageable with a radially inner surface of said biasing section.

14. The compressor assembly of claim 13 wherein said valve head has a second surface disposed opposite said first surface and facing said guide member, said guide member including at least one longitudinally extending passageway in fluid communication with said discharge chamber and extending to a distal end of said guide member proximate said valve head.

15. The compressor assembly of claim 14 wherein said at least one longitudinally extending passageway comprises a plurality of longitudinally extending recesses extending along an outer surface of said guide member.

16. The compressor assembly of claim 9 wherein operation of said compressor mechanism creates a maximum pressure differential between said compression chamber and said discharge chamber of at least about 500 psi.

17. A compressor assembly comprising:
   a compressor mechanism having a compression chamber and a discharge chamber;
   a discharge port providing fluid communication between said compression chamber and said discharge chamber;
   a valve seat surface circumscribing said discharge port;
   a discharge valve member having a valve head, a biasing section and a valve support, said valve support being mounted to said compressor mechanism by a non-threaded elongate coupling member extending through a laterally extending opening in said valve support, pivotal movement of said biasing section relative to said coupling member being limited by a guide member; said biasing section biasing said valve head in a longitudinal direction toward said valve seat surface and said valve head having a first surface, said first surface having a substantially convex shape and being sealingly engageable with said valve seat surface; and said guide member extending in said longitudinal direction, said guide member engageable with said biasing section wherein engagement of said guide member and biasing section limits lateral movement of said valve head to lateral positions wherein said valve head is sealingly engageable with said valve seat surface, said guide member being spaced from said valve head when said valve head is sealingly engaged with said valve seat surface.

18. The compressor assembly of claim 17 wherein said biasing section circumscribes said guide member and said guide member is engageable with a radially inner surface of said biasing section, said guide member further including a second laterally extending opening, said coupling member wherein said coupling member extends through said second laterally extending opening to thereby secure said guide member to said compressor mechanism.

19. A compressor assembly comprising:
 a compressor mechanism having a compression chamber and a discharge chamber;
 a discharge port providing fluid communication between said compression chamber and said discharge chamber;
 a valve seat surface circumscribing said discharge port;
 a discharge valve member having a valve head, a biasing section and a valve support, said valve support being mounted to said compressor mechanism; said biasing section biasing said valve head in a longitudinal direction toward said valve seat surface and said valve head having a first surface, said first surface having a substantially convex shape and being sealingly engageable with said valve seat surface; and a guide member extending in said longitudinal direction wherein said guide member has a plurality of longitudinally extending recesses extending to a distal end of said guide member proximate said valve head, said valve head having a second surface disposed opposite said first surface and facing said guide member, said second surface having a substantially concave shape, said guide member engageable with said biasing section wherein said biasing section circumscribes said guide member and said guide member is engageable with a radially inner surface of said biasing section wherein engagement of said guide member and biasing section limits lateral movement of said valve head to lateral positions wherein said valve head is sealingly engageable with said valve seat surface, said guide member being spaced from said valve head when said valve head is sealingly engaged with said valve seat surface.

* * * * *